United States Patent [19]
Polge et al.

[11] Patent Number: 5,790,893
[45] Date of Patent: Aug. 4, 1998

[54] SEGMENTED CONCURRENT RECEIVE/ TRANSFER INTERFACE USING SHARED RAM STORAGE

[75] Inventors: Steven Eric Polge, Cary, N.C.; Robert Siegel, Gaithersburg, Md.

[73] Assignee: International Business Machines Corporation, Armonk, N.Y.

[21] Appl. No.: 658,791

[22] Filed: Jun. 5, 1996

[51] Int. Cl.$^6$ .................................... G06F 11/00
[52] U.S. Cl. ........................ 395/873; 395/185.02
[58] Field of Search ............... 395/873, 185.02, 395/733

[56] References Cited

U.S. PATENT DOCUMENTS

| | | | |
|---|---|---|---|
| 5,163,132 | 11/1992 | DuLac et al. | 395/873 |
| 5,381,528 | 1/1995 | Brandle | 395/873 |
| 5,396,597 | 3/1995 | Bodin et al. | 395/873 |
| 5,502,822 | 3/1996 | Takebe | 395/873 |

*Primary Examiner*—Jack B. Harvey
*Assistant Examiner*—David A. Wiley
*Attorney, Agent, or Firm*—Joscelyn G. Cockburn; John B. Frisone

[57] ABSTRACT

A communication adapter connected between a communication line and a host processor segments a received data frame by storing the received data in a buffer chain made up of equal length buffers. As each buffer is filled, the adapter interrupts the host. The host moves the data stored in the filled buffer into its own storage. It interrupts the adapter so that the buffer can be returned to the chain of free buffer and completes transmission protocol processing before the entire frame is received. If the frame has been received without error or buffer overrun it is delivered to the user immediately after transfer of the last buffer.

6 Claims, 9 Drawing Sheets

5,790,893

1

SEGMENTED CONCURRENT RECEIVE/TRANSFER INTERFACE USING SHARED RAM STORAGE

FIELD OF THE INVENTION

This invention relates to the field of data communications and more particularly to a structure and a method for transferring a block of data received from a communications network to a user application which is running in a connected computer substantially concurrently with receipt of the data from the network.

BACKGROUND OF THE INVENTION

In the past, networks have, regardless of the architected physical connectivity, received complete data messages or blocks and checked them for accuracy of transmission before passing them on to an ultimate user program. This technique appears to adversely impact the users perception of the response time of the network.

In those networks in which only short blocks of data are transmitted, the perception is not harmful. However, in networks where large blocks of data are transmitted, the impact on the perception of response time can be significant and any improvement which can be achieved with little or no cost is of great value.

SUMMARY OF THE INVENTION

The invention contemplates a structure and method for segmenting a block or stream of received data by storing the data in a chain of equal sized buffers located in a communication adapter. As each buffer is filled, it is transferred across the host processor input/output bus by a driver and delivered to a transport application (such as Novel's IPX program or IBM's NETBIOS program) running in the host processor along with the driver and the user application program. The data is checked for accuracy of reception as it is received in the adapter and as the last buffer is transferred the status of the received frame or block of data is also transferred. If the data is invalid the user application is denied access to the data. The transport application program can complete all transport protocol processing prior to receipt of status from the communication adapter and if the status is good the received data it turned over to the user program immediately.

DESCRIPTION OF THE PREFERRED EMBODIMENT

Figure 1:
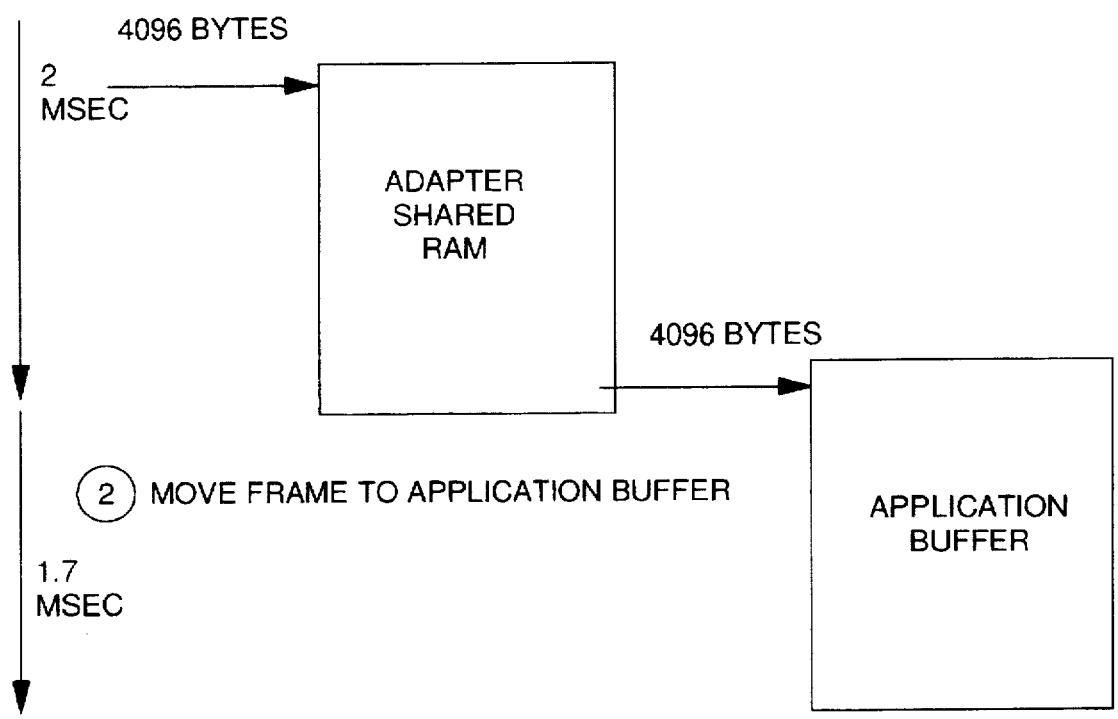
FIG. 1 is a flow diagram of a prior art receive interface.

The receive interface illustrated in FIG. 1 is typical of the prior art. Data from the communication line is received and stored in a communication adapter shared RAM. It is checked and handed over to a driver, running in the host system with the transport program, which moves the data from the shared RAM to a host application buffer in the host processor.

With a block or message size of 4,096 bytes, this process consumes approximately 3.7 msec in a typical computer. A segmented receive interface constructed according to the invention and illustrated in FIG. 2 consumes 2.2 msec when the same hardware is utilized. This results in an improvement in latency of more than 40 percent, a significant benefit.

Figure 2:
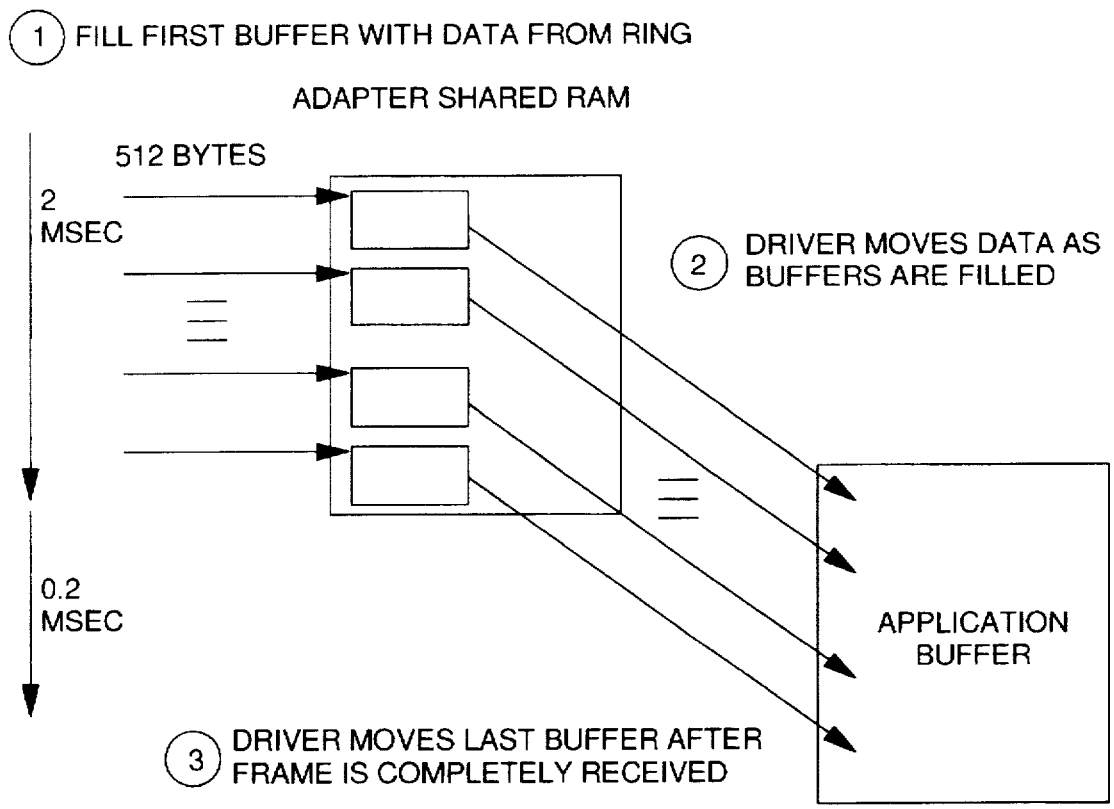
FIG. 2 is a flow diagram of a segmented receive interface according to the invention.

In FIG. 2 the incoming data is segmented by storing the data in a chain of buffers, each having 512 bytes. As soon as the first buffer is filled the input handler interrupts the driver which moves the data in the first buffer across the processor I/O bus into a host application buffer. As each additional buffer is filled it is moved into the host application buffer by the driver. The last buffer may or may not be completely filled depending on the exact length of the block. Along with the last buffer, the status of the block (valid/invalid) is provided. Based on the status, the received block is turned over to the application program or dumped.

Figure 3:
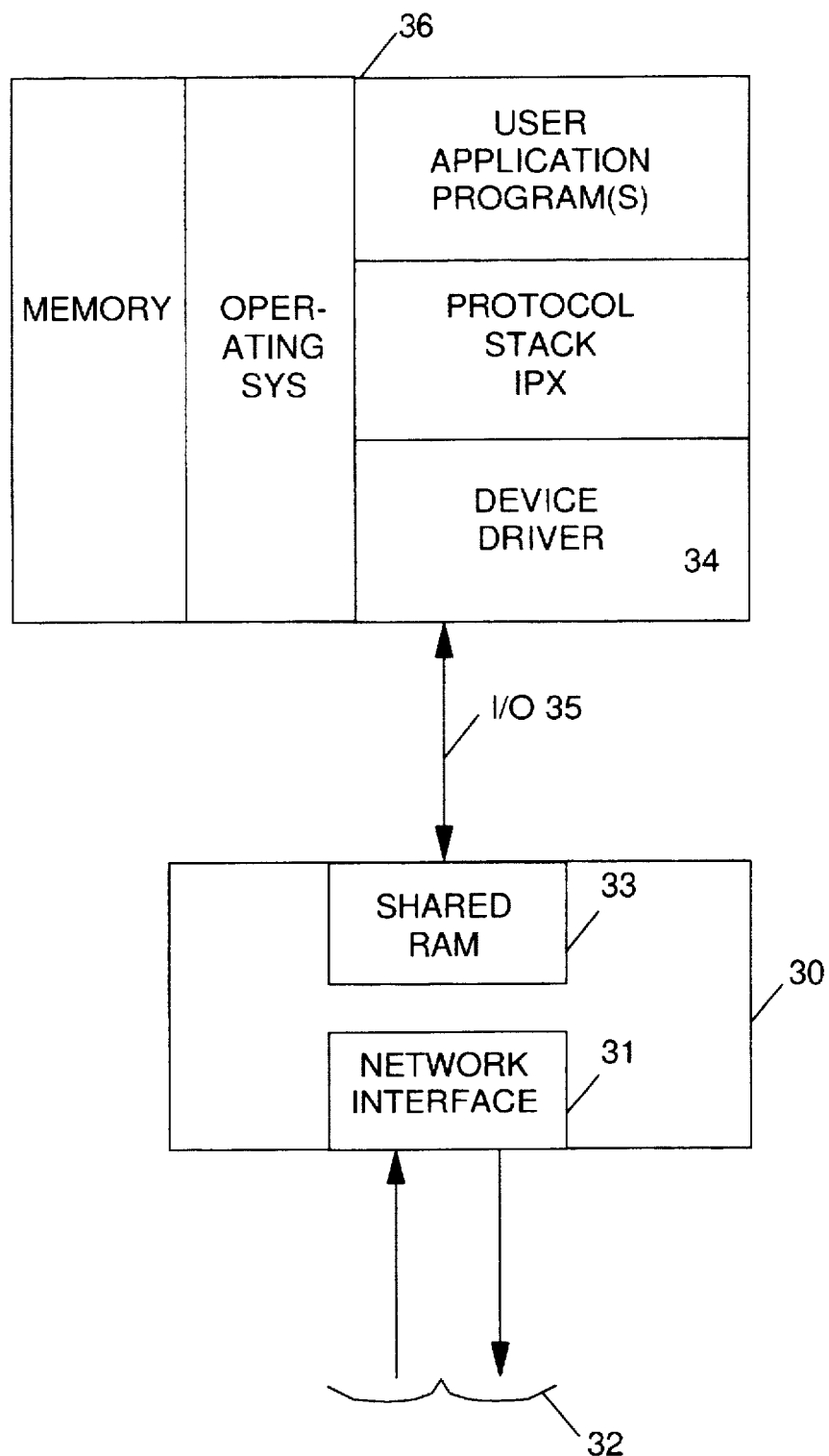
FIG. 3 is a block diagram illustrating received data flow.

In FIG. 3, an adapter 30 includes a network interface and an input handler 31 connected to the network 32 and to a shared RAM memory 33. Data from network 32 is received by the network interface and input handler 31 and segmented by storing the data in a plurality of equal fixed length chained buffers in the shared RAM 33.

When the input handler 31 fills a buffer in memory 33, it interrupts the driver 34 which is responsible for moving the buffer full of data across an I/O bus 35 to the host application buffer in the host or programmed CPU 36 for further processing by the transport application or protocol stack.

Figure 4:
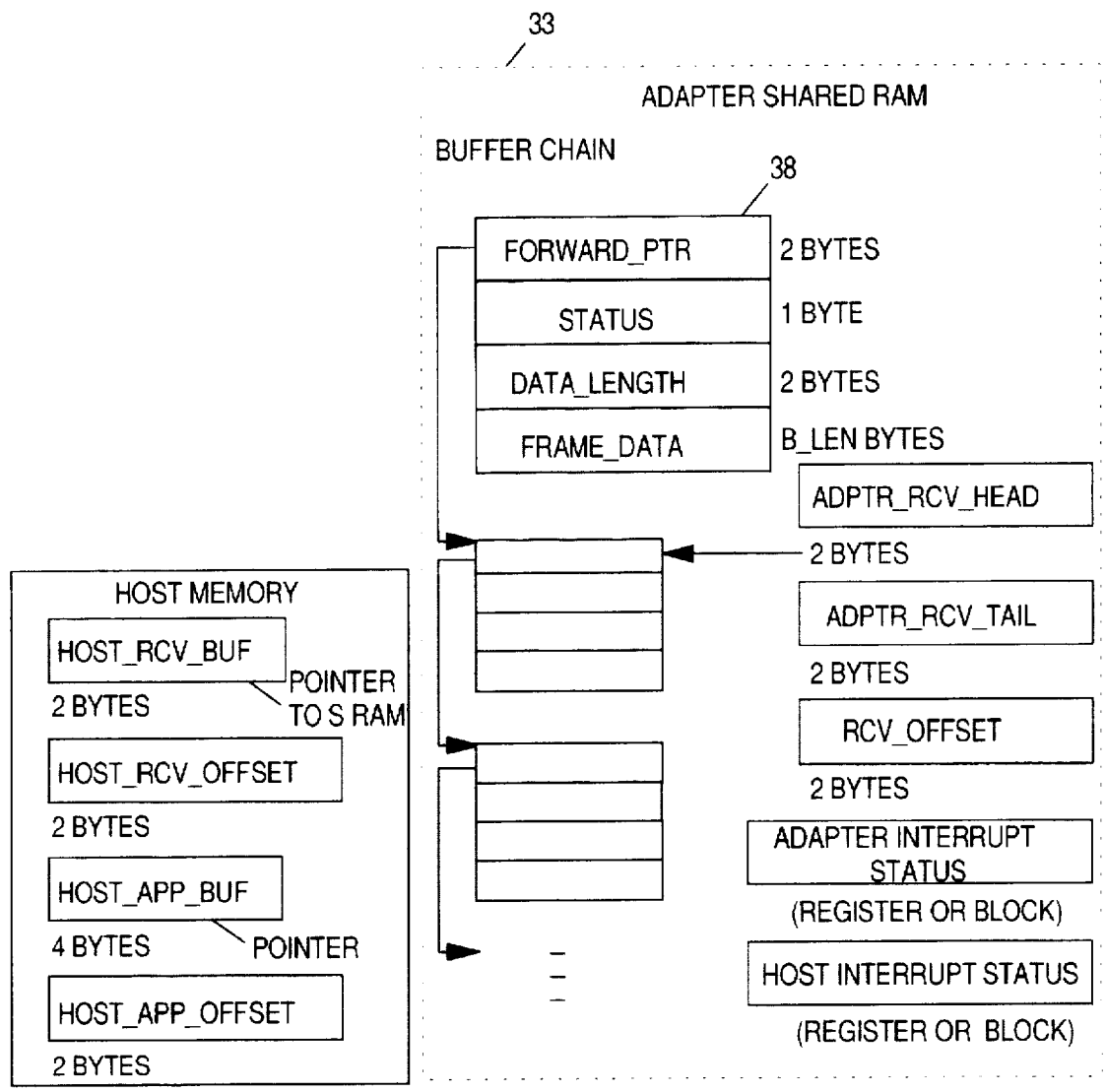
FIG. 4 is a block diagram illustrating the content and organization of the adapter shared RAM and the organization of a portion of the host or processor memory; and, FIGS. 5A, 5B, 6A, 6B and 7 are flow diagrams illustrating the operation of both the adapter and the driver running in the host processor for moving received data from the communication link across the host I/O bus to the host memory for further processing by the transport application and subsequent use by the user application program.

The organization of the adapter shared RAM 33 is illustrated in FIG. 4. The shared RAM is divided into a plurality of equal fixed length buffers 38. Each buffer has a two byte forward pointer which is the address of the next sequential buffer in the chain of buffers; one byte is reserved for status; two bytes are used for indicating the length of the data stored in the buffer in the event that the buffer contains the end of a message or frame; and a fixed number of bytes (B_LEN bytes) are reserved for storing received data. The buffer chain is circular and the forward pointer of the last buffer points to the first buffer.

In addition to the buffers described above the shared RAM includes two bytes which are the address of the first free buffer or head of the chain (ADPTR_RCV_HEAD). It also includes two bytes which are the address of the last free buffer or tail of the chain (ADPTR_RCV_TAIL). It addition it includes two bytes (RCV_OFFSET) for defining an offset from the ADPTR_RCV_HEAD where the next byte of data is to be stored. The RCV_OFFSET is incremented after each storage operation. When the RCV_OFFSET equals B_LEN the buffer is full and another buffer, if available, must be placed at the head. How this and other steps are implemented will be described below. The shared RAM also includes two blocks of storage for storing adapter and host interrupt status.

Also illustrated in FIG. 4 are four values stored in the host 36 memory. These are: a two byte address (HOST_RCV_BUF) which points to the starting address of the buffer in shared RAM 33 which is to be moved across the I/O bus by the driver; a two byte offset value (HOST_RCV_OFFSET), initially set at zero, indicating the offset from the starting address HOST_RCV_BUF for the next data byte to be moved; a four byte host application buffer address (HOST_APP_BUF) defining the starting address in the host memory where the frame or block of data is to be stored; and, a two byte host application offset (HOST_APP_OFFSET), initially set at zero, indicating where the next byte transferred by the driver is to be stored with resect to the starting address HOST_APP_BUF.

Figure 5A:
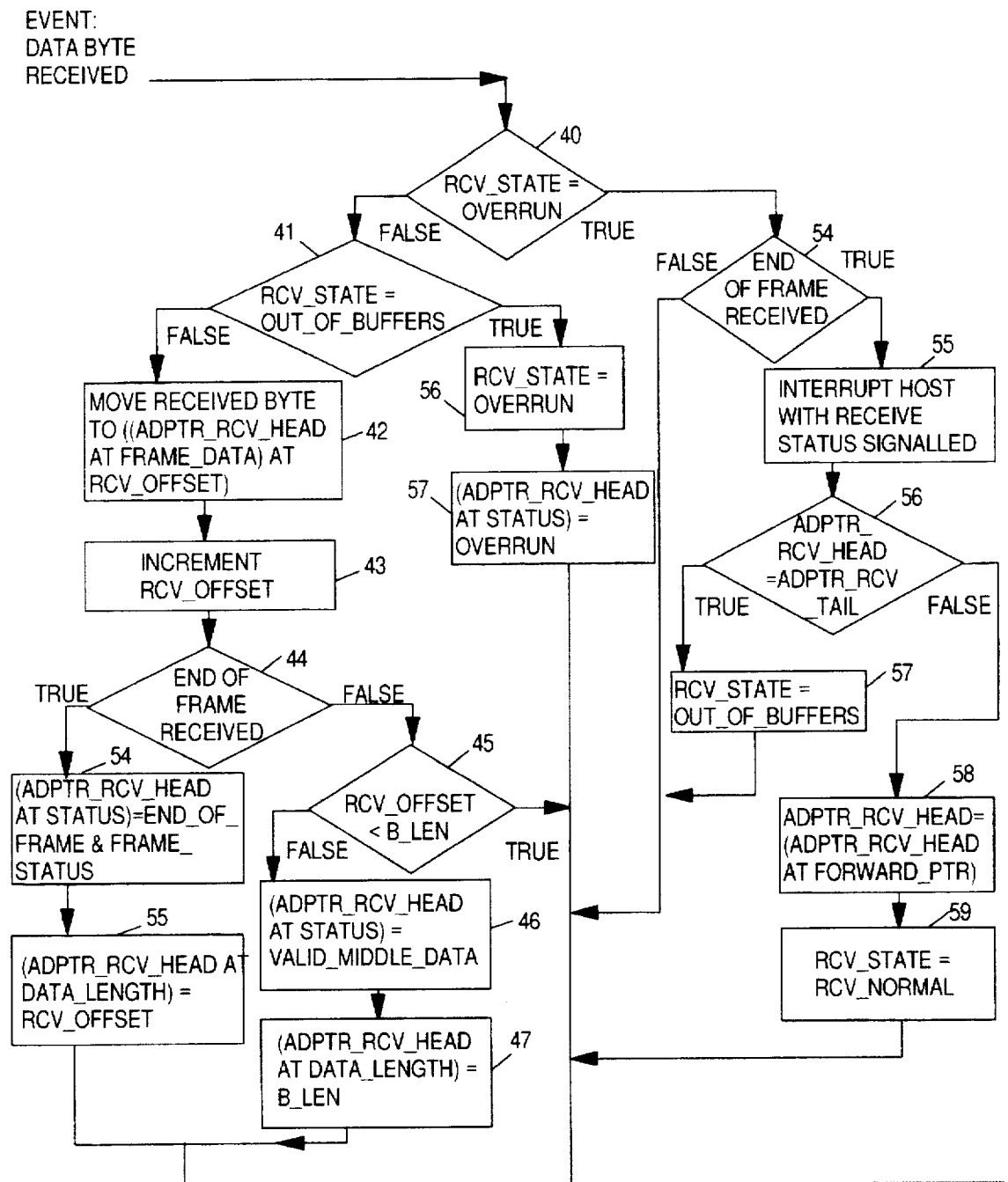
Figure 5B:
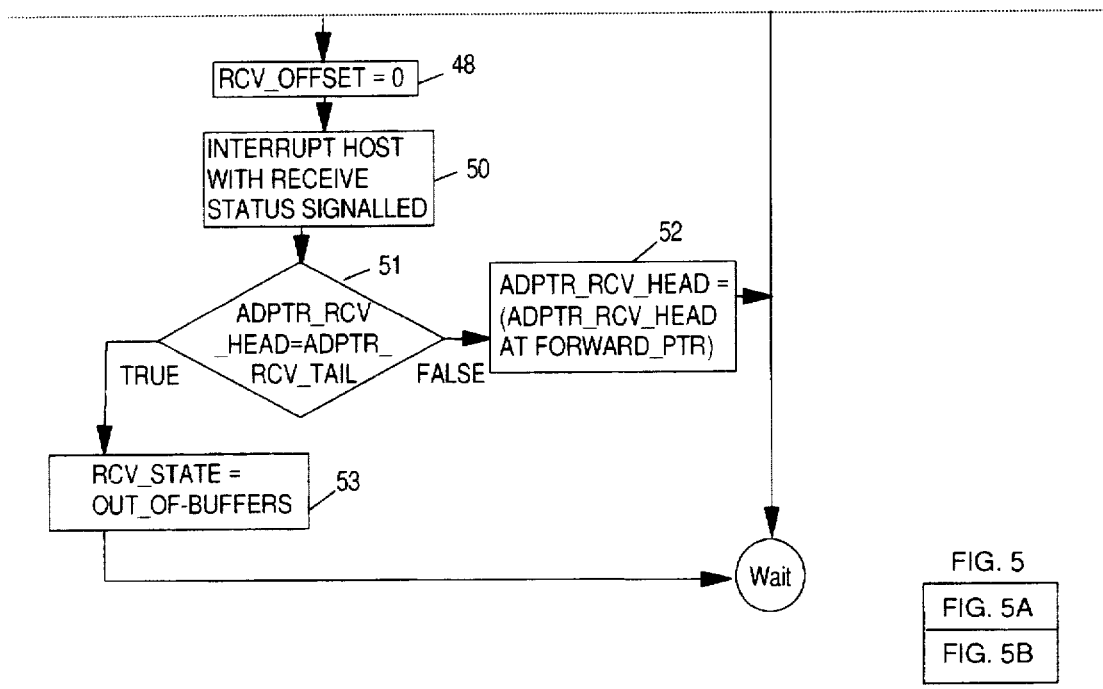

The flow diagram illustrated in FIG. 5 is executed in the communication adapter 30. The adapter 30 can be in one of three receive states depending on the availability of buffers. In one state RCV_NORMAL at least one buffer (either full or partial) is available for storing a received byte. In the second state $OUT_{13}$ OF_BUFFERS no buffers are available. Once the adapter enters this state it remains there until a buffer is freed in which case it returns to the RCV_NORMAL state or if a byte is received before a buffer is freed it changes state to the third state OVERRUN.

As each data byte is received, the receive state of the adapter (and shared RAM 33) is checked. If the receive state is normal blocks 40 and 41 exit false. The received data byte is stored in the shared RAM 33 at the address specified by the adapter RCV_HEAD plus the RCV_OFFSET 42 and the RCV_OFFSET is incremented 43 to await the next byte. If the last byte was not the end of the frame 44 the RCV_OFFSET is checked 45 to see if is less than B_LEN. If it is, that indicates that there is room in the buffer for at least one more byte of data and the program goes to wait where it awaits the next byte.

If 45 exits false the buffer is full; the status is marked VALID_MIDDLE_DATA 46; the data length is marked B_LEN 47 (indicating a full buffer) and the RCV_OFFSET is set to zero 48 in anticipation of selecting the next free buffer in the buffer chain. The driver in the host is interrupted 50 so that it can transfer the buffer across the processor I/O to the host application buffer in the processor. If the ADPTR_RCV_HEAD does not equal the ADPTR_RCV_TAIL 51 the FORWARD_PTR of the ADPTR_RCV_HEAD becomes the new ADPTR_RCV_HEAD 52 and the program goes to wait. If 51 exits true the RCV_STATE is set to OUT_OF_BUFFERS 53 and the program goes to wait.

If the program exits 44 true status is set END_OF_FRAME and FRAME_STATUS 54 and the data length is set to RCV_OFFSET 55. If 41 exits true the RECEIVE STATE is set to OVERRUN 56 and the ADAPTR_RCV_HEAD status is set to OVERRUN 57 and the program goes to wait.

If the adapter receive state is OVERRUN, block 40 exits true. The program checks to see if the end of frame was received 54. If it was not the program goes to wait. If the end of frame was received, the program interrupts the device driver running in the host with received status signalled 55. If the ADAPTR_RCV_HEAD is equal to the ADAPTR_RCV_TAIL 56, the adapter receive state is changed to OUT_OF_BUFFERS 57 and the program goes to wait. When the program exits block 56 false, the ADAPTR_RCV_HEAD is changed to the FORWARD_PTR of the ADAPTR_RCV_HEAD 58 and the RCV_STATE is RECV_NORMAL 59 and then the program goes to wait.

Figure 6A:
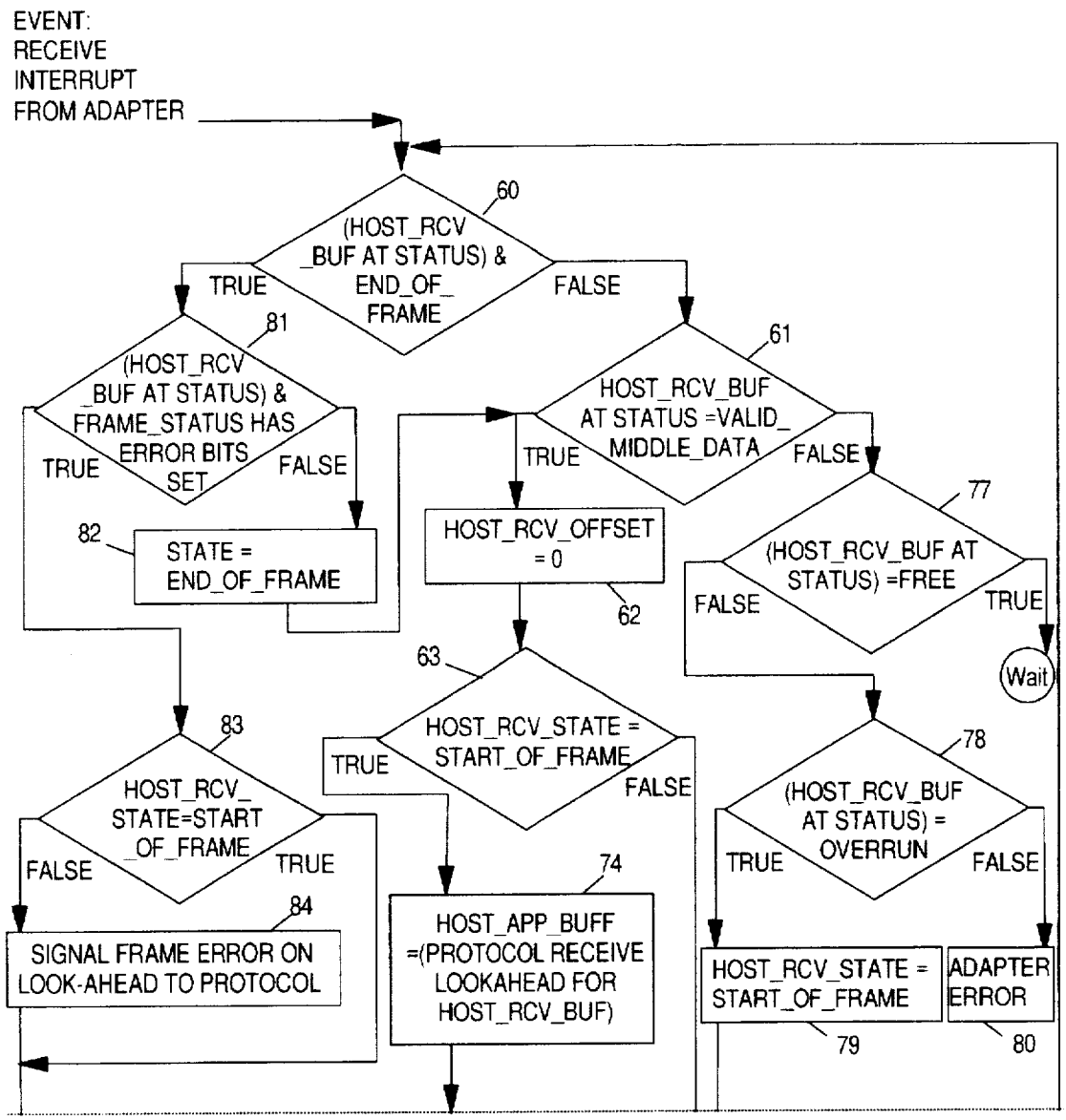
Figures 6, 6A, 6B:
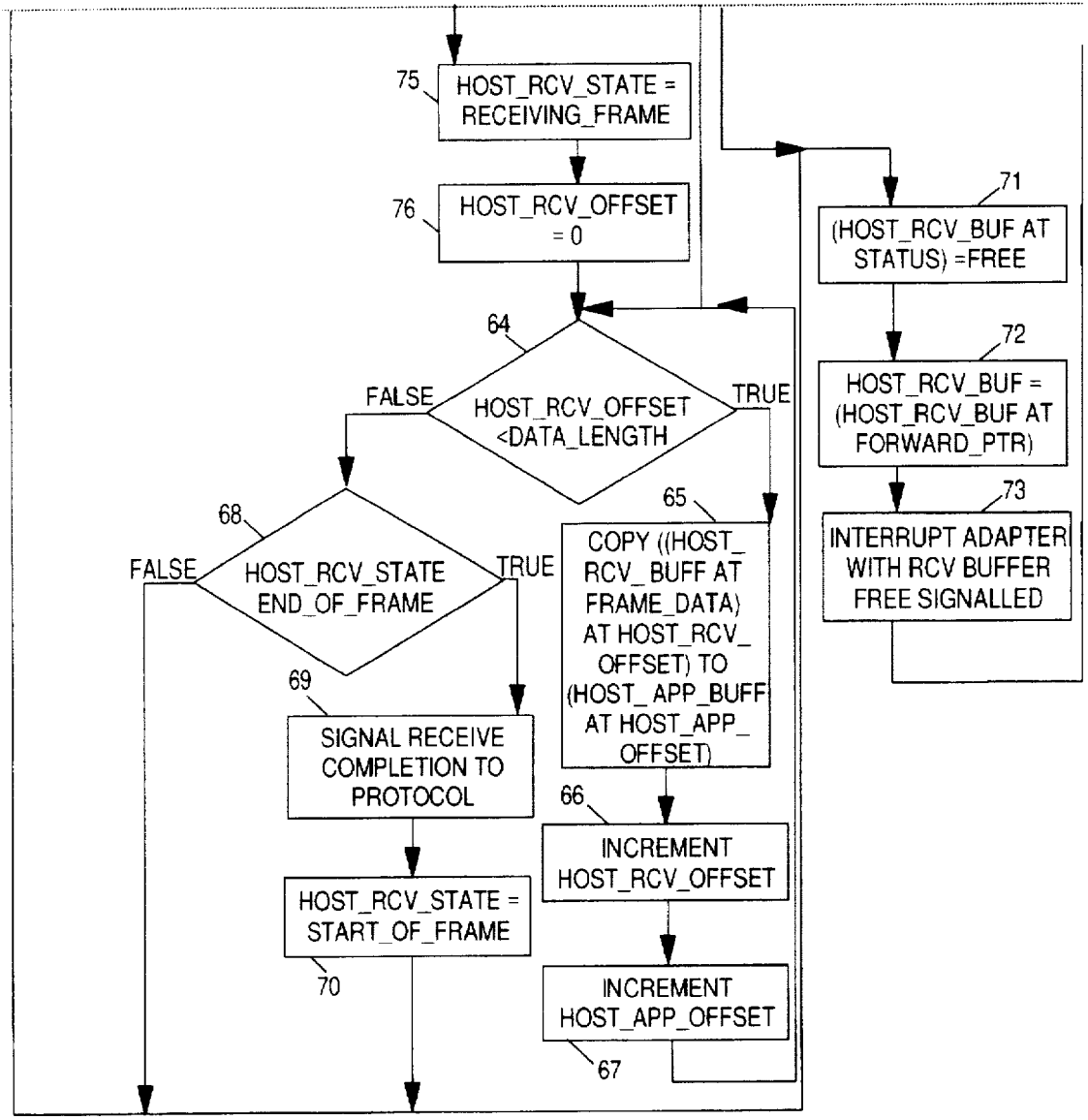

The flow diagram illustrated in FIG. 6 is executed in the host 30 by the device driver. The program can be in one of three receive states. These are: START_OF_FRAME, RECEIVING_FRAME or END_OF_FRAME. When the driver receives an interrupt from the adapter program indicating that a buffer has been filled it checks the status byte of the buffer 60 to determine if it is an $END\_OF_{13}$ FRAME.

If false and the status indicates VALID_MIDDLE_DATA 61, the HOST_RCV_OFFSET is set equal to zero 62.

If the HOST_RCV_STATE=START_OF_FRAME 63 exits false the HOST_RCV_OFFSET is checked to see if it is less than the DATA_LENGTH 64. If it is less, the loop 65, 66 and 67 moves the received data contents from the shared RAM in the adapter into the application buffer in the host memory. When the buffer is emptied block 64 exits false. If the buffer was an end of frame 68, the transport is notified that the frame has been received and the HOST_RCV_STATE is set to START_OF_FRAME 70 in preparation for receipt of the next frame.

Afterwards the HOST_RCV_BUF status is set to FREE 71; the HOST_RCV_BUF is set to the HOST_RCV_BUF at FORWARD_PTR 72 and the adapter is interrupted to indicate that a buffer has been freed 73. When block 68 exits false the program goes to goes to blocks 71–73 directly since the buffer was valid middle data and functions 69 and 70 are not appropriate.

If block 63 exits true indicating a START_OF_FRAME, the driver signals the transport protocol 74 and provides the HOST_RCV_BUF pointer to the transport protocol and receives the HOST_APP_BUF pointer from the transport protocol; sets the HOST_RCV_STATE to RECEIVING_FRAME 75 and sets the HOST_APP_OFFSET equal to zero 76 and proceeds as described above.

When block 61 exits false and the HOST_RCV_BUF status 77 is free, the driver goes to a wait state since the buffer is empty. If block 77 exits false and the HOST_RCV_BUF status is OVERRUN 78 the HOST_RCV_STATE is set equal to START_OF_FRAME 79 and if block 78 exits false an adapter error 80 is noted.

When block 60 exits true, indicating an end of frame, the frame status is checked 81. if the error bit is not set the state is set to END_OF_FRAME 82 and goes to block 62 as previously described. If the frame status error bit is set, the START_OF_FRAME state is checked 83. If it is set, the program proceeds to 71. If it is reset the program signals the transport protocol of a frame error 84 and then goes to block 71.

Figure 7:
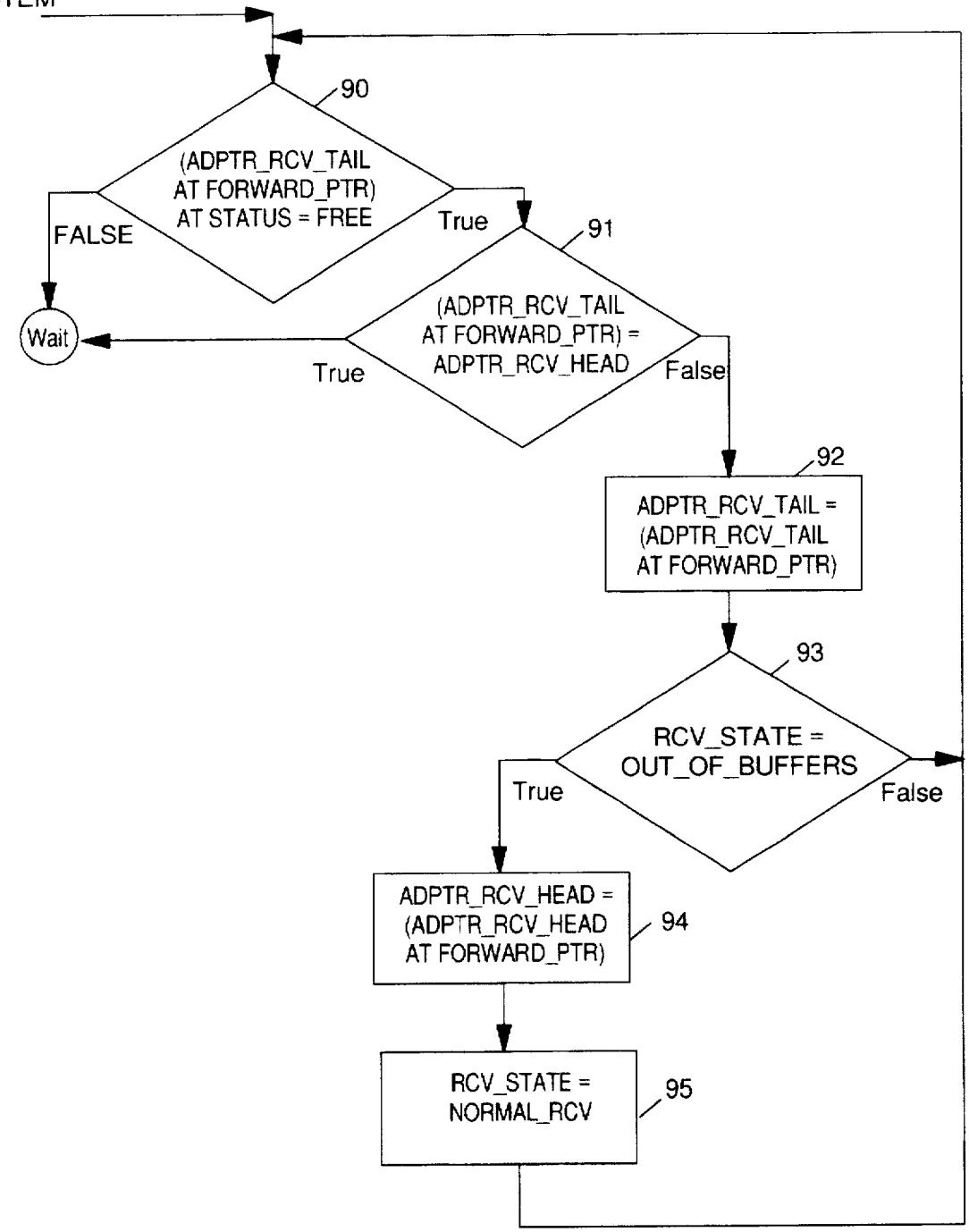

The flow diagram illustrated in FIG. 7 is executed in the communication adapter and is designed to restore freed buffers to the buffer chain by modifying the ADPTR_RCV_TAIL. When the adapter receives a buffer free interrupt from the driver it checks the FREE status of the buffer indicated by the FORWARD_POINTER of the ADPTR_RCV_TAIL 90. If it is FREE it checks to see if the FORWARD_POINTER of the ADPTR_RCV_TAIL is equal to the ADPTR_RCV_HEAD 91. If they are not equal it replaces the ADPTR_RCV_TAIL with ADPTR_RCV_TAIL FORWARD_POINTER. If the RCV_STATE 93 is OUT_OF_BUFFERS, the FORWARD_PTR of the ADPTR_RCV_HEAD is made the ADPTR_RCV_HEAD 94 and the RCV_STATE is set to NORMAL_RCV 95.

While a single embodiment of the invention has been described and illustrated in detail it should be obvious to those skilled in this art that changes can be made without departing from the spirit or scope of the invention.

We claim:

1. In a data communication equipment having a programmed communication adapter including a memory for receiving data frames from a communication line and a programmed host computer connected to the said adapter by an input/output bus, a method for segmenting data frames received from the said communication line and transporting each segment across the said input/output bus to the programmed computer as soon as it is received, including the following steps:

at said adapter;

establishing a buffer chain including a plurality of fixed length buffers each including a forward pointer identifying the location in the memory of the next buffer in the chain and a data field for storing received data, storing received data in the data field of the first free buffer in the chain and interrupting the programmed computer when the buffer is full, storing subsequently received data in the buffer identified by the forward pointer of the just filled buffer if the pointed to buffer is free and can accept received data and repeating the process until the frame is received, checking the received data to detect transmission errors to verify validity of the received data, generating status information indicating validity of the received data in the frame and including the status information in the interrupt for the last buffer of the frame, at said programmed computer;

in response to each said interrupt transferring in sequence the contents of the buffer across the input/output bus to the host processor and interrupting the adapter to indicate completion of the transfer, completing all communication protocol processing as soon as sufficient protocol data is transferred, and delivering the transferred data to a user program located in the host only if the status received with the last buffer of a frame indicates valid reception.

2. The method set forth in claim 1 including the following steps:

establishing a first field in the adapter memory for identifying the location in the adapter memory of the first free buffer in the chain;

establishing a second field in the adapter memory for storing an offset value which when combined with the value stored in the first field yields the location in the adapter memory where a received data element is to be stored;

incrementing the stored offset value each time a received data element is stored; and, comparing the incremented offset value to the maximum capacity of the buffer and replacing the value stored in the first field with the forward pointer stored in the buffer when the offset value equals the maximum capacity of the buffer.

3. The method set forth in claim 2 including the following steps:

establishing a third field in the adapter memory for identifying the last free buffer in the chain of buffers; and, in response to the receipt of an interrupt from the host indicating that a buffer has been successfully transferred changing the contents of the said third field to indicate the just freed buffer thus restoring the buffer to the chain of free buffers.

4. The method set forth in claim 3 including the following steps establishing a status field in each buffer for indicating when the buffer is free and able to accept received data and data length field for indicating the length of data stored in the buffer.

5. The method set forth in claim 4 including the following steps at initialization of the data communication equipment:

loading the starting address of the first buffer in the chain in the said first field;

setting the second field to zero;

loading the starting address of the last buffer in the chain into the said third field; and, setting the status of all buffers in the chain to indicate that the buffer is free.

6. The method set forth in any one of claims 1 through 5 in which the plurality of fixed length buffers are equal in storage capacity.

* * * * *